United States Patent
Reich et al.

(10) Patent No.: US 11,599,598 B2
(45) Date of Patent: Mar. 7, 2023

(54) SYSTEM AND METHOD FOR RECOMMENDING CHALLENGES

(71) Applicant: Canon U.S.A., Inc., Melville, NY (US)

(72) Inventors: Robert Reich, Boulder, CO (US); Charles Bergmeier, San Francisco, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/905,563

(22) Filed: Jun. 18, 2020

(65) Prior Publication Data
US 2020/0401647 A1 Dec. 24, 2020

Related U.S. Application Data

(60) Provisional application No. 62/863,643, filed on Jun. 19, 2019.

(51) Int. Cl.
| | |
|---|---|
| *G06F 16/957* | (2019.01) |
| *G06F 16/9536* | (2019.01) |
| *G06F 16/583* | (2019.01) |
| *G06F 16/532* | (2019.01) |
| *G06Q 50/00* | (2012.01) |

(52) U.S. Cl.
CPC ........ *G06F 16/9577* (2019.01); *G06F 16/532* (2019.01); *G06F 16/583* (2019.01); *G06F 16/9536* (2019.01); *G06Q 50/01* (2013.01)

(58) Field of Classification Search
CPC .. G06F 16/532; G06F 16/583; G06F 16/9536; G06F 16/9577; G06Q 50/01
See application file for complete search history.

(56) References Cited

U.S. PATENT DOCUMENTS

| | | | |
|---|---|---|---|
| 8,332,429 B2 | 12/2012 | Poirier et al. | |
| 8,535,162 B2 | 9/2013 | Newman et al. | |
| (Continued) | | | |

FOREIGN PATENT DOCUMENTS

| | | | | |
|---|---|---|---|---|
| CN | 109523344 A | * | 3/2019 | |
| CN | 110476405 A | * | 11/2019 | ........... G06N 3/0445 |
| KR | 101653041 B1 | * | 8/2016 | |

OTHER PUBLICATIONS

Hakim Kinan and Wotzlaw Ronald Frank, "Photo Composition and Position Guidance in an Imaging Device", published Oct. 12, 2016, Document ID: KR20160119221A, pp. 10 (Year: 2016).*

*Primary Examiner* — Chau T Nguyen
(74) *Attorney, Agent, or Firm* — Canon U.S.A., Inc., IP Division (57) ABSTRACT

An image processing apparatus and method is provided. The apparatus includes one or more processors and one or more memories storing instructions that, when executed, configures the one or more processors, to identify one or more photos associated with a user account of an online community and identify one or more descriptors characterizing an image capture style and are associated with the identified photos, determine, based on the identified descriptors associated with the identified images, one or more descriptors to be proposed to a user corresponding to the user account of the online community, and generate a graphical user interface for outputting, to a user, a request for content that represents the determined proposed descriptors for performing image capture based on the output request.

18 Claims, 4 Drawing Sheets

(56) References Cited

U.S. PATENT DOCUMENTS

| | | | |
|---|---|---|---|
| 9,405,964 B1* | 8/2016 | Suchland | G06Q 50/01 |
| 9,495,614 B1* | 11/2016 | Boman | G06F 16/29 |
| 9,531,823 B1* | 12/2016 | Suchland | H04L 67/22 |
| 9,697,541 B1 | 7/2017 | Daniel | |
| 9,789,394 B2 | 10/2017 | Gross | |
| 9,858,298 B1* | 1/2018 | Barak | G06F 16/27 |
| 10,025,491 B2 | 7/2018 | Lerner et al. | |
| 10,049,477 B1* | 8/2018 | Kokemohr | G06T 11/60 |
| 2008/0162503 A1* | 7/2008 | Narasimhan | G06F 16/9535 |
| 2011/0050909 A1* | 3/2011 | Ellenby | H04N 5/23222 |
| | | | 348/207.1 |
| 2011/0184953 A1* | 7/2011 | Joshi | G06F 16/51 |
| | | | 707/738 |
| 2011/0222796 A1* | 9/2011 | Nakamura | H04N 17/002 |
| | | | 382/309 |
| 2012/0323930 A1* | 12/2012 | Kennberg | G06F 16/5866 |
| | | | 707/748 |
| 2013/0148864 A1* | 6/2013 | Dolson | G06F 16/58 |
| | | | 382/115 |
| 2013/0262588 A1* | 10/2013 | Barak | G06F 16/5866 |
| | | | 709/204 |
| 2014/0380420 A1* | 12/2014 | Wang | G06F 16/5866 |
| | | | 726/4 |
| 2015/0182861 A1 | 7/2015 | Winter et al. | |
| 2015/0188720 A1 | 7/2015 | Winter | |
| 2015/0229838 A1* | 8/2015 | Hakim | H04N 5/23222 |
| | | | 348/333.02 |
| 2016/0124964 A1 | 5/2016 | Caicedo | |
| 2016/0226805 A1 | 8/2016 | Marovets | |
| 2017/0093780 A1* | 3/2017 | Lieb | G06F 16/58 |
| 2017/0103072 A1* | 4/2017 | Yuen | G06F 16/9535 |
| 2017/0103425 A1 | 4/2017 | Christofi et al. | |
| 2017/0177589 A1* | 6/2017 | Shorman | G06Q 50/01 |
| 2017/0200183 A1* | 7/2017 | Lim | G06Q 50/01 |
| 2019/0339824 A1 | 11/2019 | Hamedi et al. | |
| 2019/0342239 A1* | 11/2019 | Brandt | G06F 16/955 |

* cited by examiner

SYSTEM AND METHOD FOR RECOMMENDING CHALLENGES

CROSS REFERENCE TO RELATED APPLICATIONS

This nonprovisional patent application claims the benefit of priority from U.S. Provisional Patent Application Ser. No. 62/863,643 filed on Jun. 19, 2019, the entirety of which is incorporated herein by reference.

BACKGROUND

Field

The present disclosure relates generally to image capture and evaluation of captured images.

Description of Related Art

Online social communities exist and gather a plurality of individual users together in order to enable interaction between such users. These communities allow for users to have profiles and various information contained therein that describe one or more aspect of the user and which may be shared with all or only a subset of other users in the community. Common features associated with these online social communities include sharing and commenting on content and engaging in threaded discussion about shared content. In certain instances, the content being shared and discussed include one or more photographs. In certain other instances, the online community may suggest other content that may interest a user based on previous social interactions. However, while this type of recommendation broadens the content that may be available to the user, it does not push the user to create or share different content. Instead, these recommendations are merely created by other users to further social interaction. A drawback associated with these type of communities and interactions is that they are passive and do not encourage the user to add and contribute to the community. They also do not evaluate content contribution provided by the users of the community. A system and method remedies the above noted drawbacks.

SUMMARY

According to an embodiment, an image processing apparatus and method are provided. Included is one or more processors and one or more memories storing instructions that, when executed, configures the one or more processors, to identify one or more photos associated with a user account of an online community and identify one or more descriptors characterizing an image capture style and are associated with the identified photos, determine, based on the identified descriptors associated with the identified images, one or more descriptors to be proposed to a user corresponding to the user account of the online community, and generate a graphical user interface for outputting, to a user, a request for content that represents the determined proposed descriptors for performing image capture based on the output request.

In one embodiment, the one or more descriptors other than the descriptors associated with the identified photos are determined as the descriptors to be proposed to the user. In another embodiment, the one or more descriptors are descriptors that are associated with the identified photos but do not meet a predetermined threshold of usage among other users are determined as the descriptors to be proposed to the user.

In another embodiment, the apparatus identifies a category associated with the user account, wherein the descriptors other than the identified descriptors and the category same as the identified category are proposed to the user corresponding to the user account. For example, the category may include at least one of wildlife, street, portrait and wedding. In an embodiment, at least one of the descriptors represents at least one of main subject, ISO setting, Aperture setting, color settings and emotion.

In a further embodiment, the apparatus determines a skill level of the user corresponding to the user account, wherein the number of the descriptors to be proposed to the user is determined based on the identified skill level.

In another embodiment, the apparatus receives, through a user interface, one or more images captured based on the request representing the proposed descriptors and evaluates the received one or more images to determine of the one or more images can successfully be characterized by the proposed descriptors.

These and other objects, features, and advantages of the present disclosure will become apparent upon reading the following detailed description of exemplary embodiments of the present disclosure, when taken in conjunction with the appended drawings, and provided claims.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples. Further, where more than one embodiment is described, each embodiment can be combined with one another unless explicitly stated otherwise. This includes the ability to substitute various steps and functionality between embodiments as one skilled in the art would see fit.

An object is to provide a system and method that is operable in an online social community that would automatically request, from a user, one or more data objects representing content that will be included in the online social community and which will be viewable by at least the user and other users of the community. The requested content will include one or more requirements that are determined by a recommendation engine based upon profile information of the user to which the request is issued and, optionally, profile information of one or more other users of the community. The requirements associated with the requested content may include one or more descriptors that characterize one or more aspect of the content being requested. The descriptors reflect qualitative and/or quantitative aspects of the content to allow for evaluation thereof. Upon receipt of the requested content, an evaluation engine evaluates one or more data elements of the received content to determine if the one or more requirements associated with the original content request have been met. This advantageously enables the user who provided the content to the online community to have their content objectively evaluated without the user or other users input. Each user of the community has status information associated therewith that identifies and/or characterizes a relationship of each user to each other user within the community. The automatic evaluation performed by the evaluation engine uses descriptors of other users as a basis for the evaluation and can advantageously determines a similarity of user submitted content to that of other users so that user status information for the user may change based on the determined similarity.

Figure 1:
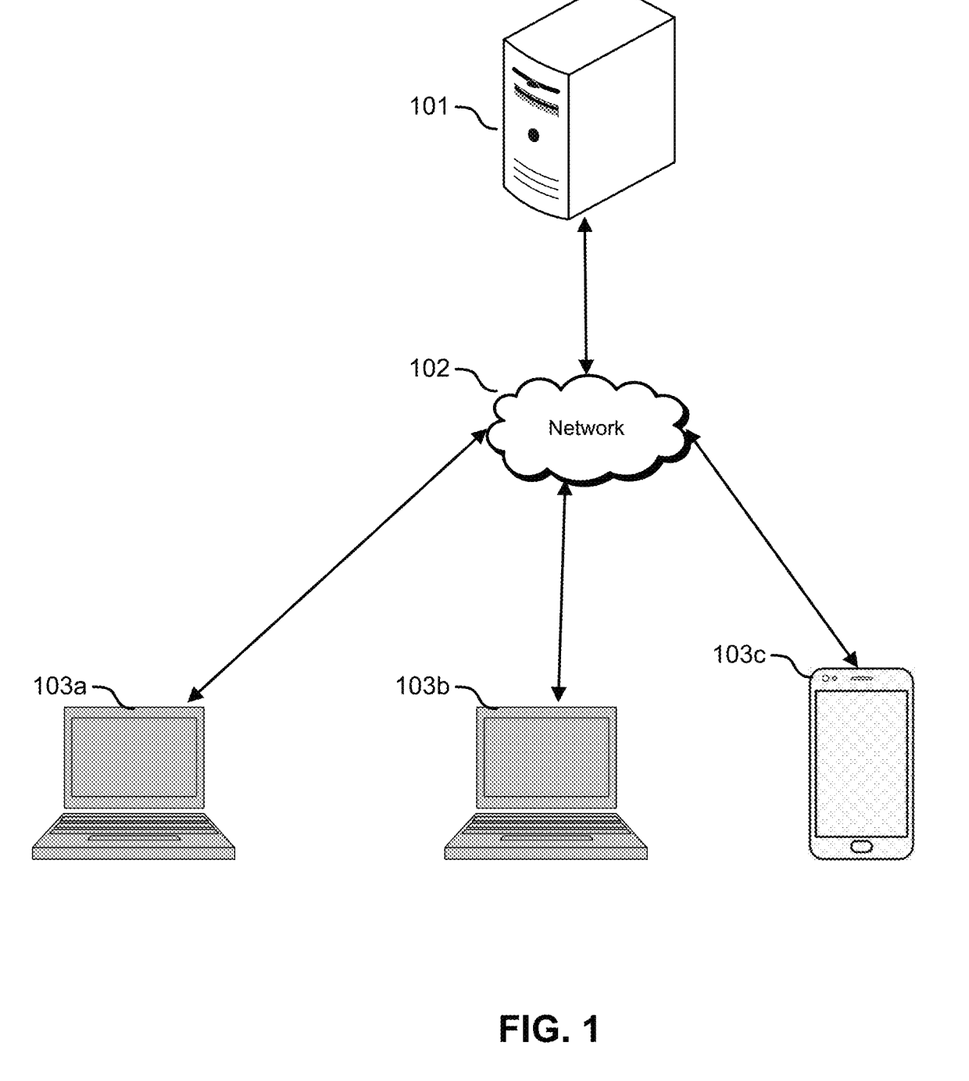
FIG. 1 illustrates an operational environment including a recommendation server and a plurality of user devices.

FIG. 1 illustrates an exemplary online community that includes a server 101 which is an image processing apparatus. The server 101 includes hardware that is configured, based on the execution of a set of instructions stored in memory, to provide a remotely accessible online community that allow users to connect thereto in order to interact with elements of the online community as well as other users of the community. Also provided by the server 101 is the recommendation and evaluation engines described herein. As shown herein, the server 101 is illustrated as a singular server but this is merely exemplary. Skilled artisans in the cloud computing design and implementation will understand that one or more servers 101 may be employed to effect the generation of both the online community and the recommendation and evaluation system described herein. The server 101 and online community provided thereby is accessible by a plurality of different information processing apparatuses such as user devices 103*a*-103*c*. As used herein, user and user devices may be used interchangeably. FIG. 1 illustrates the users 103*a*-103*c* but this is done for purposes of example only and it should be understood that many more users (and associated devices) will make up the online social community provided by server 101. Each of the users 103*a*-103*c* is illustrated herein by a type of device that is used to access the online community provided by server 101. As shown herein users 103*a* and 103*b* are able to selectively access and interact with the server 101 via a laptop computing device while user 103*c* is able to access the online can selectively access and interact with the server 101 via a mobile computing device such as a smart phone. The illustration of these types of devices is for purposes of example only and any type of computing device that can communicate via network to access a server 101 may be used.

Bidirectional communication between the server 101 and users 103*a*-103*d* is facilitated by a network 102. Communication is enabled by one or more communication interfaces included in the respective devices (server and each of the user computing devices). The communication interfaces includes hardware, software, or both providing one or more interfaces for communication (such as, for example, packet-based communication) between the system 900 and one or more other servers or one or more networks. As an example and not by way of limitation, the communication interface may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface for it. As an example and not by way of limitation, the system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the system may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these.

In one embodiment, the online social community provided by server 101 is a photography community whereby users of the community are photographers of different skill levels. As part of this interaction, a user could signify their willingness to participate in an online challenge and, in response to user submitting confirmation of such willingness, the community issues notification of an event representing a challenge that is generated based on at least one characteristic that describes the user and is part of the user's profile. In another embodiment, the at least one characteristic may represent something that the user does not normally do but that is associated with other characteristics in which the user routinely participates. In other embodiments, the at least one characteristic may be associated with a data object associated with a user and that is shared with one or more users of the community in a private or public manner. For example, a user in an online photography community may have a plurality of images associated with the user's profile. The images may have one or more descriptors (e.g. tags) associated therewith providing description or context about the image. In determining the challenge, the community may parse the tags associated with the user's images and select one or more tags from a set of tags that are not present in any of the images and suggest a challenge whereby a user is to capture and upload an image that could then be associated with the tag that is not associated with the user's data. In this manner, the community advantageously seeks to expand the ability of the user by causing the user to obtain an image that is outside of the user's current skillset. In another embodiment, the community may provide a notification to a user that includes information that may be a subject of a challenge which is then selectable by a user prior to initiation of the challenge. The community may determine the challenges based on user specified skill level and at least one category of photography. In other embodiments, determining the task to be completed by the user can also be derived based on social interactions of the user (e.g. who the user follows, indications that the user like a particular user or user-content).

The challenge provided by the community may require the user to complete a particular task that could then be characterized in a particular way. In one embodiment, the result of the task could be characterized based on the at least one characteristic used to recommend the challenge. The challenge event generated by the community and suggested to the user advantageously uses machine learning to analyze the data submitted (e.g. the image) to automatically determine a plurality of tags that could be attributable to the submitted data. The challenge is deemed successful by the community in response to the machine learning algorithm determining that the characteristic that was provided as part of the challenge recommendation can be found within the data submitted by the user.

Figure 2:
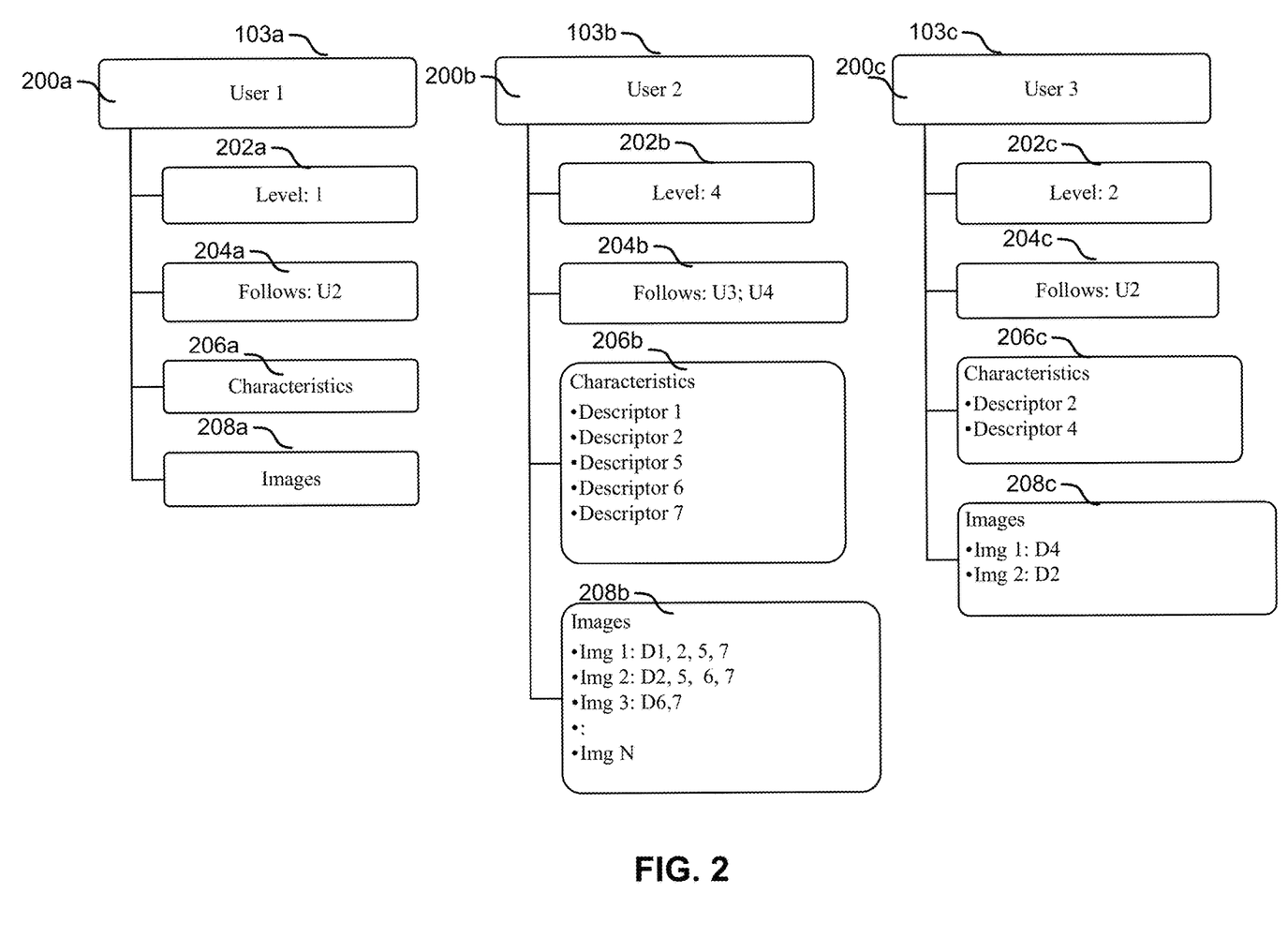
FIG. 2 illustrates an exemplary set of user profile data used by an exemplary recommendation system.

FIG. 2 illustrates a subset of user profile information associated with each of users 103a-103c that are relevant for implementing the processing for requesting content and evaluating content in the context of an online social community. If a particular type of information commonly associated with users of an online social community is not explicitly referenced herein, it should not be understood that it is omitted. Rather, the profile information described herein is described to illustrate the recommendation and evaluation processing within an online community which is the subject of this disclosure.

FIG. 2 illustrates selective user profile information for each of Users 103a-103c. User profile information comprises a plurality of data fields storing particular type of data that is selectively usable by the recommendation and evaluation system described herein. The type of information in the user profile will be described, generally, with respect to User 103. User profile information includes a user status information field, a user association field, a characteristics field and an images field. The user status information field includes information indicating a skill level or ranking level. In one embodiment, the status information indicates a skill level compared to all other users based on the content provided by the user. In another embodiment, the status information includes a user-defined skill level that ranks the type of content provided by the user. The user following field indicating information the identified other users in the community that the particular user is associated with. In one embodiment, this user association indicates which other user are followed by a particular user. In another embodiment, the user association indicates which other users are friends with a particular user. The characteristics field includes one or types of descriptors that describe one or more types of characteristics that have been associated with content provided to the community by the particular user. In one embodiment, descriptors are image tags that have been associated with a particular piece of content (e.g. data object such as an image captured by an image capture device). Examples of types of descriptors can be found below in Tables 1 and 2.

TABLE 1

Types of Image Descriptors

| Tag Type | Definition | Rules |
| --- | --- | --- |
| Category | Maps to a photography industry, examples include: wildlife, street, portrait, wedding, etc... | We have aligned to 24 categories |

TABLE 1-continued

Types of Image Descriptors

| Tag Type | Definition | Rules |
| --- | --- | --- |
| Main Subject | Uses a bounding box and defines the central concept of the photograph | Requires a bounding box to drawn around the subject |
| Subject | Objects within a photo | Could be anything within an image and an image could have many subjects |
| Emotion | The emotion of a photograph, examples include happy and sad | |
| Style | The technical style used, examples include: warm, Black and White, Complementary | Has a fixed set of values |
| Composition | Where the subjects are located within a photo, examples include the rule of thirds, center composition and leading lines | |
| Place | Places are existing structures, examples include: buildings, restaurants, beaches, mountains, sports arena | |
| Concept | Concepts describe specific types of action within a photograph, examples include: dancing, fishing, playing tennis | |
| Technical | The evaluation of how an image was taken, examples include: focus, lighting, grain | |

In another embodiment, the descriptors stored in the characteristics field of the user profile may include information characterizing the type of equipment used to capture content and/or settings of the equipment used to capture content at the time the content was captures. In an exemplary embodiment, the captured content is an image file and the image file include EXIF data which is data generated by the image capture device at the time the image was captures. Exemplary equipment-based descriptors are illustrated below in Table 2.

TABLE 2

Equipment Type Descriptors

| EXIF Name | Description |
| --- | --- |
| Model | Camera model |
| Lens Model | Lens model and manufacturer |
| FocalLength | The focal length of the lens is the distance between the lens and the image sensor when the subject is in focus, usually stated in millimeters |
| ISO | The ISO speed controls the sensitivity of the film or the sensor that absorbs the light. The higher the ISO speed, the more sensitive the film or sensor is to light. |
| F# | aperture is the unit of measurement that defines the size of the opening in the lens that can be adjusted to control the amount of light reaching the film or digital sensor. The size of the aperture is measured in F-stop. |

TABLE 2-continued

Equipment Type Descriptors

| EXIF Name | Description |
| --- | --- |
| Shutter speed | shutter speed or exposure time is the length of time when the film or digital sensor inside the camera is exposed to light, also when a camera's shutter is open when taking a photograph. |

The above listed types of equipment descriptors are common types of data stored in an EXIF file. However, any information about the equipment and the settings of the equipment used when capturing the image file can be stored as EXIF data and thus may be included as equipment type descriptors for purpose of this disclosure.

Also included in the user profile is an images field that includes information identifying the images provided by the particular user to the online community. This may include the full image file itself or a subset of the image file (e.g. thumbnail) or a pointer that identifies where the image is actually stored within the server 101. In one embodiment, included, in association with the image information, are the descriptors associated with the particular image.

Turning now to the user profile information shown in FIG. 2, a first user 103a is provided with a user profile 200a. The user profile 200a for the first user 103a indicates, in the status information field 202a that they are a Level 1. The user profile 200a, in the user association field 204a, that the first user 103a follows the second user 103b. According the profile for the first user 103a, there is no data stored in the characteristics field 206a or the image field 208a. This may be indicative that the first user 103a is beginner or low leveled user and that they have not contributed any content to the community.

The user profile 200b for the second user 103b indicates, in the status information field 202b that they are a Level 4. The user profile 200b, in the user association field 204b, that the second user 103b follows the third user 103c and a fourth user (not shown). In the characteristics field 206b of the second user profile 200b, data stored therein indicates the types of descriptors associated with all of the second user's 103b content and the image field 208b lists the images contributed by the second user 103b to the community and shows which of the descriptors stored in the characteristics field 206b are associated with particular images. In this example, the second user 103b is a more advanced user as they have contributed a plurality images where each image has at least two descriptors associated therewith.

The user profile 200c for the third user 103c indicates, in the status information field 202c that they are a Level 2. The user profile 200c, in the user association field 204c, that the third user 103c follows the second user 103b. In the characteristics field 206c of the third user profile 200c, data stored therein indicates the types of descriptors associated with all of the third user's 103c content and the image field 208c lists the images contributed by the third user 103c to the community and shows which of the descriptors stored in the characteristics field 206c are associated with particular images. In this example, the third user 103c is an intermediate user between the skill level of the first user 103a and second user 103b they have contributed two where each image has one descriptors associated therewith.

It should be noted that the number of descriptors and images listed does not directly indicate the level of the user but is described herein to illustrate a comparison between different level of users. Moreover, the indication of user levels as beginner, intermediate and advanced is for purposes of illustration only. In fact, the level of a user may be determined on a sliding scale and may be continually modified based both on the content provided by the particular user and results of the challenges suggested by the recommendation and evaluation system of the online community.

Figure 3:
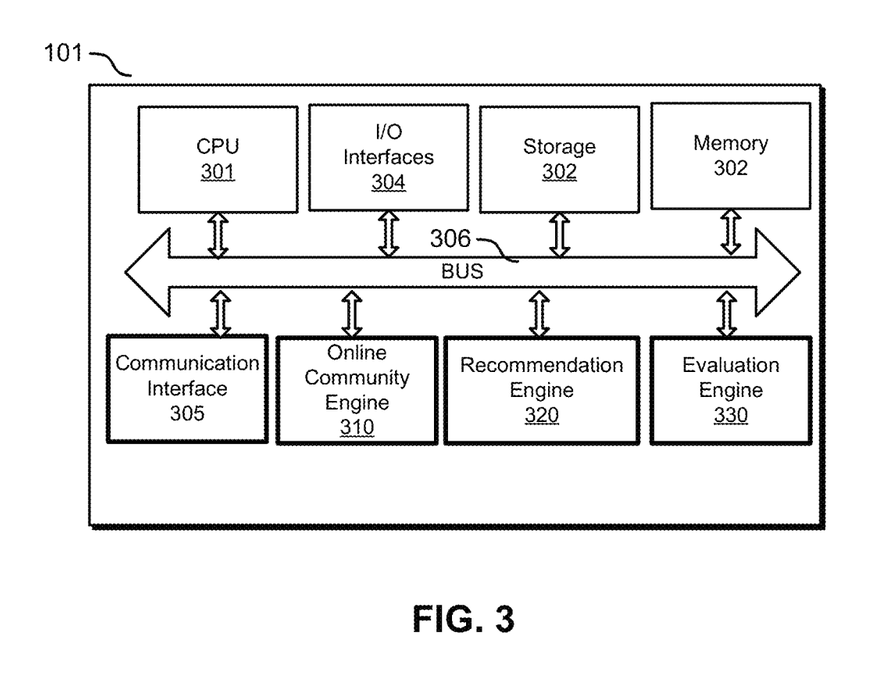
FIG. 3 is a block diagram representing the hardware components that are configured to operate as a recommendation system.

FIG. 3 is a block diagram detailing the hardware components of the server 101. It should be understood that the described community and data operation is embodied as one or more servers including one or more storage devices that are present within the cloud and are accessible by one or more computing devices including desktop computers, laptop computers, tablets, smartphones and the like. The term community as used herein above refers to one or more applications that are executed by one or more processing units (e.g. CPUs, ASICs, etc.). The one or more applications executing on the one or more servers execute instructions for providing an interactive community of users. When the above refers to the community performing an action or causing something to occur, it should be understood that this is caused by a set of instructions that configure the one or more processors of the server to perform the described operation and/or action. The hardware components of an exemplary computing system that is configured to execute the algorithm discussed below. The term computing device (or computing system) as used herein includes but is not limited to a hardware device that may include one or more software modules, one or more hardware modules, one or more firmware modules, or combinations thereof, that work together to perform operations on electronic data. The physical layout of the modules may vary. A computing device may include multiple computing devices coupled via a network. A computing device may include a single computing device where internal modules (such as a memory and processor) work together to perform operations on electronic data. Also, the term resource as used herein includes but is not limited to an object that can be processed at a computing device. A resource can be a portion of executable instructions or data.

In some embodiments, the computing device 300 performs one or more steps of one or more methods described or illustrated herein. In some embodiments, the computing device 300 provides functionality described or illustrated herein. In some embodiments, software running on the computing device 300 performs one or more steps of one or more methods described or illustrated herein or provides functionality described or illustrated herein. Some embodiments include one or more portions of the computing device 300.

The computing device 300 includes one or more processor(s) 301, memory 302, storage 303, an input/output (I/O) interface 304, a communication interface 305, and a bus 306. The computing device 300 may take any suitable physical form. For example, and not by way of limitation, the computing device 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a computing device, a tablet computer system, or a combination of two or more of these.

The processor(s) 301 include hardware for executing instructions, such as those making up a computer program.

The processor(s) 301 may retrieve the instructions from the memory 302, the storage 303, an internal register, or an internal cache. The processor(s) 301 then decode and execute the instructions. Then, the processor(s) 301 write one or more results to the memory 302, the storage 303, the internal register, or the internal cache. The processor(s) 301 may provide the processing capability to execute the operating system, programs, user and application interfaces, and any other functions of the computing device 300.

The processor(s) 301 may include a central processing unit (CPU), one or more general-purpose microprocessor(s), application-specific microprocessor(s), and/or special purpose microprocessor(s), or some combination of such processing components. The processor(s) 301 may include one or more graphics processors, video processors, audio processors and/or related chip sets. In some embodiments, the memory 302 includes main memory for storing instructions for the processor(s) 301 to execute or data for the processor(s) 301 to operate on. By way of example, the computing device 300 may load instructions from the storage 303 or another source to the memory 302. During or after execution of the instructions, the processor(s) 301 may write one or more results (which may be intermediate or final results) to the memory 302. One or more memory buses (which may each include an address bus and a data bus) may couple the processor(s) 301 to the memory 302. One or more memory management units (MMUs) may reside between the processor(s) 301 and the memory 302 and facilitate accesses to the memory 302 requested by the processor(s) 301. The memory 302 may include one or more memories. The memory 302 may be random access memory (RAM).

The storage 303 stores data and/or instructions. As an example and not by way of limitation, the storage 303 may include a hard disk drive, a floppy disk drive, flash memory, an optical disc, a magneto-optical disc, magnetic tape, or a Universal Serial Bus (USB) drive or a combination of two or more of these. In some embodiments, the storage 303 is a removable medium. In some embodiments, the storage 303 is a fixed medium. In some embodiments, the storage 303 is internal to the computing device 300. In some embodiments, the storage 303 is external to the computing device 300. In some embodiments, the storage 303 is non-volatile, solid-state memory. In some embodiments, the storage 303 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 303 may include one or more memory devices. One or more program modules stored in the storage 303 may be configured to cause various operations and processes described herein to be executed. While storage is shown as a single element, it should be noted that multiple storage devices of the same or different types may be included in the computing device 300.

The I/O interface 304 includes hardware, software, or both providing one or more interfaces for communication between the computing device 300 and one or more I/O devices. The computing device 300 may include one or more of these I/O devices, where appropriate. One or more of these I/O devices may enable communication between a person and the computing device 300. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 304 includes one or more device or software drivers enabling the processor(s) 301 to drive one or more of these I/O devices. The I/O interface 304 may include one or more I/O interfaces.

The communication interface 305 includes hardware, software, or both providing one or more interfaces for communication (such as, for example, packet-based communication) between the computing device 300 and one or more other computing devices or one or more networks. As an example and not by way of limitation, the communication interface 305 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 305 for it. As an example and not by way of limitation, the computing device 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing device 300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. Additionally the communication interface may provide the functionality associated with short distance communication protocols such as NFC and thus may include an NFC identifier tag and/or an NFC reader able to read an NFC identifier tag positioned with a predetermined distance of the computing device. The computing device 300 may include any suitable communication interface 305 for any of these networks, where appropriate. The communication interface 305 may include one or more communication interfaces 305.

The bus 306 interconnects various components of the computing device 300 thereby enabling the transmission of data and execution of various processes. The bus 306 may include one or more types of bus structures including a memory bus or memory controller, a peripheral bus, and a local bus using any of a variety of bus architectures.

Also illustrated in FIG. 3 is the online community engine 310, the recommendation engine 320 and the evaluation engine 330. Each of these engines include a series of computer executable instructions and/or applications that provide a particular type of functionality as described throughout the disclosure. The online community engine 310 generates a series of user interfaces that are accessible via a network by one or more computing devices either through the world wide web, a cellular network or a dedicated application executing on the device that is accessing the online community. The online community engine 310 allows for a plurality of users to register therewith and interact with various functions of the community and other users of the community. This includes, but is not limited to, sharing content, discussing content, messaging, viewing content, etc. Exemplary features of the online community and the manner in which they are executed are listed in Table 3. It should be noted that any reference to a "Key" in Table 3 refers to the Key # in the first column of Table 5.

TABLE 1

Online Community Features

| User Stories | Acceptance |
|---|---|
| Exploration Functions | |
| Main Story: As a user, i want to continually be inspired by other photographers and understand visually what is possible with the equipment I own Keys: 3, 4, 5, and 6 from Table 5 | using: 1) categories selected during onboarding 2) user entered tags 3) CV entered tags 4) EXIF and 5) followers the system creates an evolving personalized feed of images per user |
| Ranking: As a user, i want to continually see new images in my feed that inspire me | Ranking and sorting the feed needs to focus on freshness and quality. the data available to sort images includes: image upload date, likes, and equipment. Plus as the user uploads images we need to reduce the dependency on what was originally selected during onboarding and evolve with the photographer. |
| Spam: As a photographer, i do not want a single photographer to overwhelm my feed | No single photographer should be able to overtake a feed. Using max image counts per photographer and image upload dates, we should be limit photo bombing, plus limit the number of images by the same photographer within the same pagination set of images |
| Equipment recommendation/backfill: As a user, I want to visually see the images other photographers create using the same equipment I use Keys: 8 and 9 from Table 5 | Using a combination of EXIF data: camera model, aperture and ISO, the Categories where a photographer takes photos and adjacent categories add images to create datasets of 1000's of images. Adjacent categories are determined by looking at the set of photographers who take pictures in the same category and expanding to include the most popular categories by the group |
| User Suggestion Functions | |
| User suggestions: As a user, i want to get introductions to other photographers who are similar to me Keys: 7 from Table 5 | using EXIF camera model, lens model, aperture, ISO and at least 1 tag from each tag type recommended photographers similar photographers to follow |
| Challenge Request Functions | |
| As a photographer, I want to see a list of opportunities to improve my creativity and expand my knowledge of photography by going outside my comfort zone and taking pictures of things I do not regularly shoot Keys: 3, 10, 11, 12 and 13 from Table 5 | Comparing the tag types within the categories a photographer has uploaded images, find the most popular tag types used by other photographers that have never or rarely been used and recommend them as challenges. New users only provide category and skill level. |
| Community Performance | |
| a user should see images within 1 second of loading the page | Paginated set of images, and to improve the loading experience with people on slower connections by acquiring a color for first display |
| Lab Functions | |
| Users who are willing to contribute images to the community and help train the machine learning system. Provides information to help users understand images could be contributed and which would help the system auto tag my images more accurately. | For every tag added to the system create a counter to determine when we have 1000 images with the same tag type. For each user who uploaded an image and tags it with a tag that has less than 1000 images, show that image to the user and give them the context why that it is being displayed. Spam detection: Only show the image to a user 1 time Ranking: follow the same ranking rules as Explore |

Figure 4:
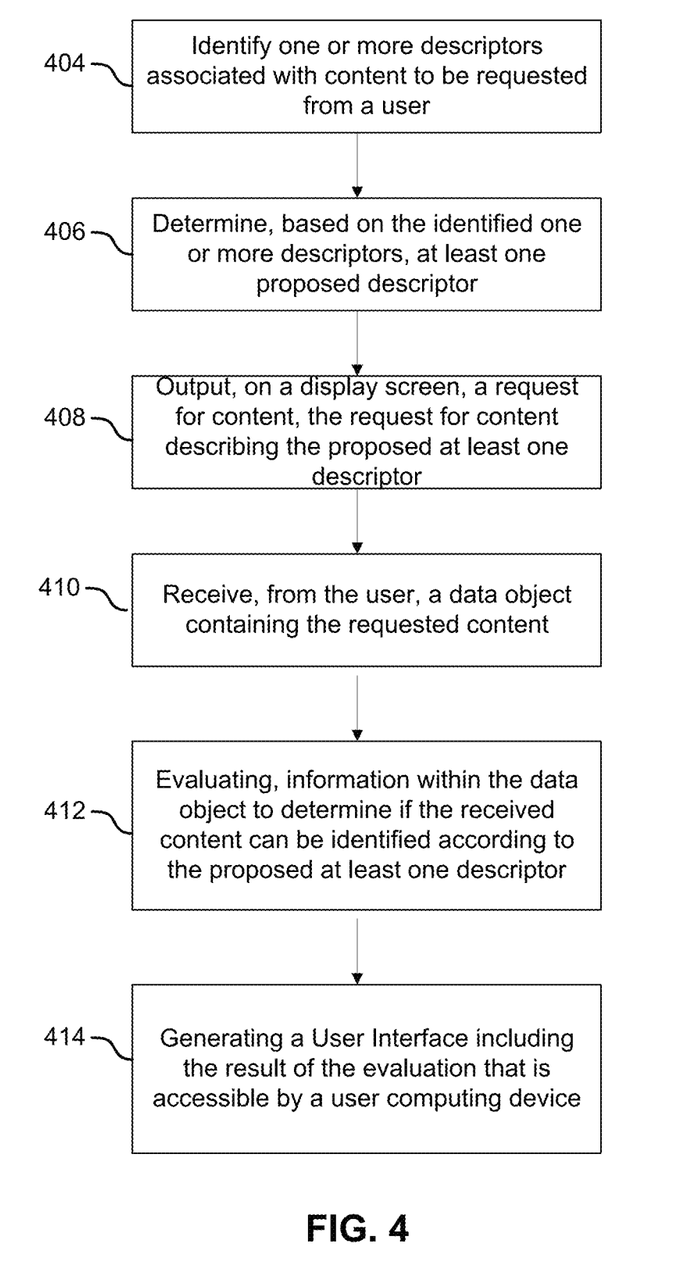
FIG. 4 is a flow diagram detailing the algorithm used by the recommendation system to recommend and evaluate user submitted content.

FIG. 4 depicts an exemplary algorithm for recommending content requests and evaluating content submitted by a user as executed by the recommendation engine 320 and evaluation engine 330 in FIG. 3 which are also comprised of instructions executable by the CPU 101 to perform the recommendation and evaluation processing described hereinbelow. The following description attributes certain functions to either the recommendation engine 320 or the evaluation engine 330. However, it should be understood that they may or may not be separate applications. The functionality provided and described herein may be performed by a single processing engine or application.

Execution of the algorithm advantageously enables the online community to which the user belongs to generate a request for content in the form of a challenge which provides the user with one or more proposed recommendations that would enable to user of the community to creatively grow. In the embodiments described herein the online community is a photography community where each of the users have various levels of skill in the art of photography. The content request generated by the algorithm of FIG. 4 provides users with a list of opportunities to improve their skill as a photographer and expand their knowledge of photography. The list of opportunities provided to the user may be generated based on similarities of descriptors associated with the user's content and other users in the community or differences in descriptors associated with the user's content and other users in the community.

Thus, in step S404, the recommendation engine executing on the server identifies one or more descriptors associated with content for inclusion in a request to the user generated by the recommendation engine. The processing in S404 uses the image content submitted by the user and stored in the user's profile. In doing so, the characteristic field and image field are queried to identify descriptors that are associated with images submitted by the user. In a case where there is no data in the characteristic field or image field of the user profile, such as with the first user 103a in FIG. 2, step S404 generates a user interface that allows a user to select one or more descriptors of a particular type of descriptors. For example, in the case where a user has no previously submitted content, a user interface (UI) is generated and presented on the user computing device. The UI includes one or more types of descriptors such as shown in Tables 1 and 2, and the user can select one therefrom. If the descriptor type presented is "category", a user may select "pets" indicating pet photography or "wedding" indicating wedding photography. These are merely exemplary and the categories should only be limited by the manner in which one or more users can describes/characterize their photographs.

In the case where the user has submitted image content, the descriptors may be input by the user when uploading the content to the online community. This may be done, for example, via an upload user interface that allows the user to select one or more descriptors from a plurality of different descriptor types so that the image can be characterized. In another embodiment, the descriptors can be automatically obtained by extracting image capture device information that is appended to the image such as EXIF information. In one embodiment, the descriptors are tags that describe a characteristic of the image content. In another embodiment, in additional to the user-defined descriptors, the user submitted content may be analyzed by a trained machine learning algorithm that has been trained with a plurality of different image types having different image characteristics. In this embodiment, the user submitted image content is evaluated using image data to determine one or more description tags to be appended thereto.

In step S406, the recommendation engine determines, based on the identified one or more descriptors, one or more proposed descriptors which characterize a content recommendation for the user. For example, in step S406, the recommendation engine parses the characteristic and image data field of the user profile to compare descriptor and descriptor types associated with user-submitted content and obtain, based on content submitted by other users of the community, descriptors that are commonly used by other users but not (or rarely) used by the user to which the recommendation is being made. This identification of descriptors commonly used by the user and descriptors that are commonly used by other users may be done using threshold processing.

Turning back to the user examples depicted in FIG. 2, the third user 103c has an image that is characterized by descriptor 2. The recommendation engine would parse all other uses, in this case, the second user 103b to determine that the second user 103b has an image characterized by descriptor 2 but that image is also characterized by descriptor 5 and descriptor 6. The result of processing in S406 would include either or both descriptor 5 and descriptor 6 being the proposed descriptor that is identified and associated with the request generated by the recommendation engine. This is merely a simplified example operation. It should be understood in an online community with a large amount of users and content, the processing would be more complex but would operate in a similar manner.

Examples of how S406 determines descriptors for inclusion in a challenge request including how the number of descriptors which are included in the challenge is governed by a challenge matrix shown in Table 4 below. The challenge matrix provides rules/constraints followed by the recommendation engine when generating a recommendation that is embodied as a request for content from a user. Challenge complexity increases based on a skill level associated with user as set forth in the status information field of the user profile. The complexity of the challenge increases by combining a plurality of descriptors (e.g. tags) together.

TABLE 4

Challenge Matrix

| | Levels | | | | | | |
|---|---|---|---|---|---|---|---|
| Tag Types | 1 | 2 | 3 | 4 | 5 | 6 | 7 |
| Category | X | | | | | | |
| Subject | X | X | X | X | X | X | X |
| EXIF | X | X | X | X | X | X | X |
| Style | | | X | X | X | X | X |
| Composition | | | | X | X | X | X |
| Emotion | | | | X | X | X | X |
| Technical | | | | | | X | X |
| Place | | | | | | X | X |
| Concept | | | | | | X | X |
| Constraint by # of tag types allowed in a challenge | 1* | 2 | 2 | 3** | 4** | 5** | all** |
| Educational links | Beginner | Beginner | Intermediate | Intermediate | Advanced | Advanced | Advanced |

*user must have uploaded images with a category and at least 1 subject tag and an image with EXIF (ISO, aperture).
**user skill level must be intermediate or higher to receive more then 2 tags for a challenge The recommendation engine, in step S406, generates proposed descriptors using images recommended that were always within the categories a photographer uploaded and labeled images, except recent photos. Proposed descriptors identified in S406 may also include descriptors representing equipment type such as being derived from images captured using the same camera model and images having similar camera setting values such as ISO and Aperture values. A summary of types of challenges including proposed descriptors are listed in Table 5 which illustrates a recommendation type chart.

TABLE 5

Recommendation Type Table

| Key | Recommendation type | Description |
| --- | --- | --- |
| 1 | RECENT_PHOTOS | Display 1 image from each photographer who uploads an image |
| 2 | FOLLOWING | Display all images by a user, when they are followed |
| 3 | SIMILAR_EMOTION | The images displayed to a user have an exact match for emotion tag associated with an image |
| 4 | SIMILAR_SUBJECTS | The images displayed to a user have an exact match for subject tags associated with an image |
| 5 | SIMILAR_COMPOSITION | The images displayed to a user have an exact match for composition tags associated with an image |
| 6 | SIMILAR_STYLE | The images displayed to a user have an exact match for style tags associated with an image |
| 7 | SIMILAR_PHOTOGRAPHER | The images displayed to a user have 1 or more tags from each tag type associated with an image. Tags include: Emotion, style, subject and composition tags associated with an image |
| 8 | SAME_CAMERA_SAME_LENS | The images displayed to a user have an exact match for Camera Model and Lens Model tags associated with an image |
| 9 | SAME_CAMERA_DIFFERENT_LENS | The images displayed to a user have an exact match for Camera Model but use a different Lens Model |
| 10 | DIFFERENT_COMPOSITION | The images displayed to a user have composition tags that are not used by the current photographer |
| 11 | DIFFERENT_EMOTION | The images displayed to a user have emotion tags that are not used by the current photographer |
| 12 | DIFFERENT_STYLE | The images displayed to a user have style tags that are not used by the current photographer |
| 13 | DIFFERENT_SUBJECTS | The images displayed to a user have subjects tags that are not used by the current photographer |

In step S408, the recommendation engine generates a user interface that is presented on the computing device of the user that includes a request for content from the user. The request for content includes information representative of the one or more proposed descriptors determined in step S406. In one embodiment, the request includes the actual determined one or more proposed descriptor. In another embodiment, the request includes descriptive information that suggests, to the user, the desired one or more descriptor determined in S406. In yet another embodiment, the request includes one or more exemplary images that can be characterized by the one or more proposed descriptors but does not explicitly note to the user what the one or more proposed descriptors are such as a hero image evoking the purpose of the challenge. This advantageously enables the user to which the request is issued to grow creatively by interpreting the challenge in a certain manner and capture an image that evokes the representation in the request. In S408, the recommendation engine may generate a challenge name and challenge assignment that is specific to the user. In one embodiment, the request may include one or more educational articles or links that are associated with the proposed one or more descriptors.

In one manner of exemplary operation, the one or more proposed descriptors represent rarely used tags by the user and/or device specific information (e.g. EXIF data) for a recommendation by comparing all tags of a user, within a specific category, to the most popular tags per tag type from the list of all users within that specific category. This results in a broad recommendation which is a category type and one or more descriptors within that category. In another manner of exemplary operation, the one or more proposed descriptors represent rarely used tag types and/or EXIF for a user to suggest by comparing all tags of a user, within a specific category that have a main subject tag (i.e., a tag that describes or characterizes an object/person/subject that is the main focus of the captured image), to the most popular tags per tag type from the list of all users within that specific category. This results in a more complex request as includes a category and main subject plus one or more tags/EXIF in the request In step S410, the server receives, from the user one or more data objects including images captured by the user. A user interface is generated by the server to allow for a user to upload image content in satisfaction of the request from S408. In one embodiment, the UI in S410 allows a user to selectively input one or more descriptors to be associated with the submitted image content. In another embodiment, the submitted image content is provided to a trained machine learning algorithm which automatically determines one or more descriptors to be associated with the user submitted image. In a further embodiment, device specific information is extracted from the data object indicating the type of device and device settings used to capture the image being received from the user.

In step S412, the evaluation engine 330 receives the image date from the user and evaluates whether or not the requirements of the request have been met. Along with the image data received, the evaluation engine also receives descriptor information associated with the received image as input by the user, extracted from the image or determined by a machine learning algorithm. The descriptor information associated with the received image is compared to the proposed one or more proposed descriptors from the request to determine if there is a match. In another embodiment, a trained machine learning algorithm may be used to evaluate technical aspects of the received image data to determine if the technical characteristics of the received image correspond to technical characteristics of the proposed one or more descriptors from the request.

In another embodiment, in addition to evaluation by the evaluation engine 330, the received image data may be submitted to the public for review and evaluation. In this embodiment, the online community would make public the particular received image data so that other users could evaluate and vote on whether the received image data satisfied the requirements of the request. In a further embodiment, involving voting, if a particular request was issued to a plurality of users, and a predetermined number of the users submitted respective image data, the community of users is advantageously encouraged to participate and vote to determine which of the images submitted by users best matches the requirements of the request issued as part of the challenge.

In step S414, the result of the evaluation is output in a user interface generated by the evaluation engine 330 and which is accessible by the computing device of the user. This results of the evaluation will indicate to the user whether the requirements of the request were successfully met. In an event that the request was not successfully met, remedial information may be included in the result that identifies which aspect(s) of the request were not met and includes instructive and/or educational materials so that the user may attempt to repeat the challenge by submitted a further image file for evaluation.

In another embodiment, a user submitted image which satisfies a requirement is awarded a success indicator such as a badge which is displayable as part of the user's profile. Thus, a successful evaluation modifies the user's profile to include the success indicator and thereby changes how the particular user will be viewed by other members of the online community. Moreover, the modification to the profile enables the user to access additional challenges with varying complexity according to the challenge complexity matrix in Table 4.

In another embodiment, an image that has been evaluated as successfully meeting the requirements of the request may be used as the hero image presented to other users who are receiving the same request to provide other users who have not yet completed a same type of request.

Exemplary results of the challenge suggestion algorithm are illustrated in Table 6 entitled "Exemplary Challenges". Table 6 links the user skill level and tags/descriptors required to generate a particular type of challenge which are determined based on the categories selected by a user, EXIF data and tags added to images.

TABLE 5

Exemplary Challenges

| Level | User tags | Skill | Challenge example |
|---|---|---|---|
| 1 | User does not upload images, and selects the category Pets during onboarding | N/A | Take a picture of someone's pet |
| 1 | User has uploaded images, Category: wedding, Subject: Bride, EXIF: Camera model: Canon 1DX, ISO: 2.4, Aperture: 1 | N/A | Take a picture of a bride |
| 1 | User has uploaded images, Category: wedding, Subject: Bride, EXIF: Camera model: Canon 1DX, ISO: 2.4, Aperture: 1 | N/A | Take a picture where the ISO setting is 2.4 |
| 1 | User has uploaded images, Category: wedding, Subject: Bride, EXIF: Camera model: Canon 1DX, ISO: 2.4, Aperture: 1 | N/A | Take a picture where the Aperture setting is 1.2 |
| 2 | User has uploaded images, Category: wedding, Subject: Bride, Style: B&W EXIF: Camera model: Canon 1DX, ISO: 2.4, Aperture: 1 | N/A | Take a picture a picture of a groom that uses complementary colors |
| 2 | User has uploaded images: Category: wedding, Subject: Bride, Style: B&W EXIF: Camera model: Canon 1DX, ISO: 2.4, Aperture: 1 | N/A | Take a picture using an aperture of 1 and use complementary colors |
| 2 | User has uploaded images: Category: wedding, Subject: Bride, Style: B&W EXIF: Camera model: Canon 1DX, ISO: 2.4, Aperture: 1 | N/A | Take a picture using a pale style and an aperture of 1 |

TABLE 5-continued

Exemplary Challenges

| Level | User tags | Skill | Challenge example |
|---|---|---|---|
| 4 | User has uploaded images:<br>Category: wedding,<br>Subject: Bride,<br>Style: B&W<br>Composition: rule of thirds<br>Emotion: happy<br>EXIF: Camera model: Canon 1DX, ISO: 2.4,<br>Aperture: 1 | intermediate | Take a picture of groom,<br>where the style is pale<br>and composition is fill<br>the frame |

It should be understood that these are merely examples of types of challenges and the requests associated therewith. This should in no way be taken as limiting as images may have any number and type of descriptors/tags associated therewith resulting in many permutation of challenges that are generated using the same principles.

The above description serves to explain the disclosure; but it should not be limited to the examples described above. For example, the order and/or timing of some of the various operations may vary from the examples given above without departing from the scope of the invention. Further by way of example, the type of network and/or computing devices may vary from the examples given above without departing from the scope of the disclosure. Other variations from the above-recited examples may also exist without departing from the scope of the disclosure.

The scope further includes a non-transitory computer-readable medium storing instructions that, when executed by one or more processors, cause the one or more processors to perform one or more embodiments described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present disclosure has been described with reference to exemplary embodiments, it is to be understood that the disclosure is not limited to the disclosed exemplary embodiments. Moreover, it should be understood that, unless expressly stated otherwise, every described embodiment can be combined with every other embodiment.

We claim:

1. An image processing apparatus comprising:
one or more processors; and
one or more memories storing instructions that, when executed, configures the one or more processors, to:
identify one or more photos associated with a user account of an online community;
identify one or more descriptors characterizing an image capture style and are associated with the identified photos;
determine, based on the identified descriptors associated with the identified photos, one or more proposed descriptors to be proposed to a user corresponding to the user account of the online community, the one or more proposed descriptors being different from any of the identified descriptors associated with the user and the one or more proposed descriptors being associated with images of other users of the online community but not associated with the identified images of the user,
generate a graphical user interface for outputting, to the user, a request for content that represents the determined proposed descriptors;
notify the user via the graphical user interface of a result of an evaluation performed on one or more images received via the graphical user interface that were captured based on the request that determines if the one or more images are characterized by the proposed descriptors.

2. The information processing apparatus according to claim 1, wherein the one or more descriptors other than the descriptors associated with the identified photos are determined as the descriptors to be proposed to the user.

3. The information processing apparatus according to claim 1, wherein the one or more descriptors are descriptors that are associated with the identified photos but do not meet a predetermined threshold of usage among other users are determined as the descriptors to be proposed to the user.

4. The information processing apparatus according to claim 1, wherein execution of the instructions further configures the one or more processors to
identify a category associated with the user account, wherein the descriptors other than the identified descriptors and the category same as the identified category are proposed to the user corresponding to the user account.

5. The information processing apparatus according to claim 4, wherein the category includes at least one of wildlife, street, portrait and wedding.

6. The information processing apparatus according to claim 1, wherein the identified descriptor is a tag.

7. The information processing apparatus according to claim 1, at least one of the descriptors represents at least one of main subject, ISO setting, Aperture setting, color settings and emotion.

8. The information processing apparatus according to claim 1, wherein execution of the instructions further configures the one or more processors to
determine a skill level of the user corresponding to the user account, wherein the number of the descriptors to be proposed to the user is determined based on the identified skill level.

9. The information processing apparatus according to claim 1, wherein execution of the instructions further configures the one or more processors to
receive, through the graphical user interface, one or more images captured based on the request representing the proposed descriptors; and
evaluate the received one or more images to determine if the one or more images can successfully be characterized by the proposed descriptors.

10. A method comprising:
identifying one or more photos associated with a user account of an online community; identify one or more descriptors characterizing an image capture style and are associated with the identified photos;
determining, based on the identified descriptors associated with the identified photos, one or more proposed descriptors to be proposed to a user corresponding to the user account of the online community, the one or more proposed descriptors being different from any of the identified descriptors associated with the user and the one or more proposed descriptors being associated with images of other users of the online community but not associated with the identified images of the user,
generating a graphical user interface for outputting, to the user, a request for content that represents the determined proposed descriptors; and
notifying the user via the graphical user interface of a result of an evaluation performed on one or more images received via the graphical user interface that were captured based on the request that determines if the one or more images are characterized by the proposed descriptors.

11. The method according to claim 10, wherein the one or more descriptors other than the descriptors associated with the identified photos are determined as the descriptors to be proposed to the user.

12. The method according to claim 10, wherein the one or more descriptors are descriptors that are associated with the identified photos but do not meet a predetermined threshold of usage among other users are determined as the descriptors to be proposed to the user.

13. The method according to claim 10, further comprising:
identifying a category associated with the user account, wherein the descriptors other than the identified descriptors and the category same as the identified category are proposed to the user corresponding to the user account.

14. The method according to claim 13, wherein the category includes at least one of wildlife, street, portrait and wedding.

15. The method according to claim 10, wherein the identified descriptor is a tag.

16. The method according to claim 10, wherein at least one of the descriptors represents at least one of main subject, ISO setting, Aperture setting, color settings and emotion.

17. The method according to claim 10, further comprising:
determining a skill level of the user corresponding to the user account, wherein the number of the descriptors to be proposed to the user is determined based on the identified skill level.

18. The method according to claim 10, further comprising
receiving, through the graphical user interface, one or more images captured based on the request representing the proposed descriptors; and
evaluating the received one or more images to determine if the one or more images can successfully be characterized by the proposed descriptors.

* * * * *